CONTAINER FOR PLANTS AND OTHER MATERIALS
AND METHOD OF MAKING SAME
Filed Oct. 14, 1970
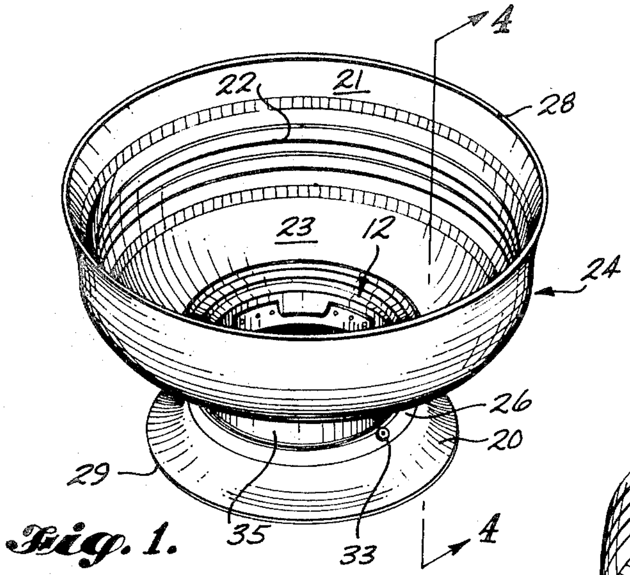
Fig. 1.
Fig. 2.
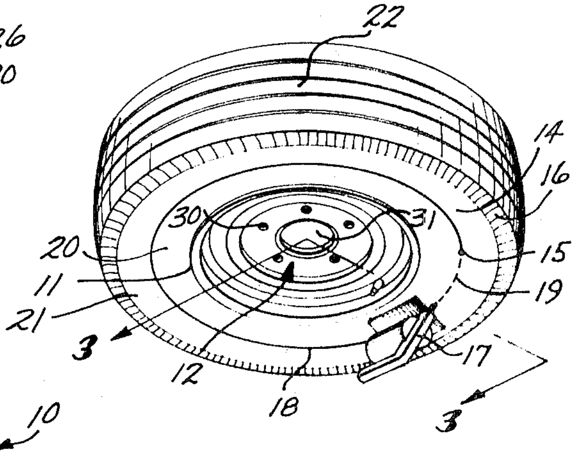
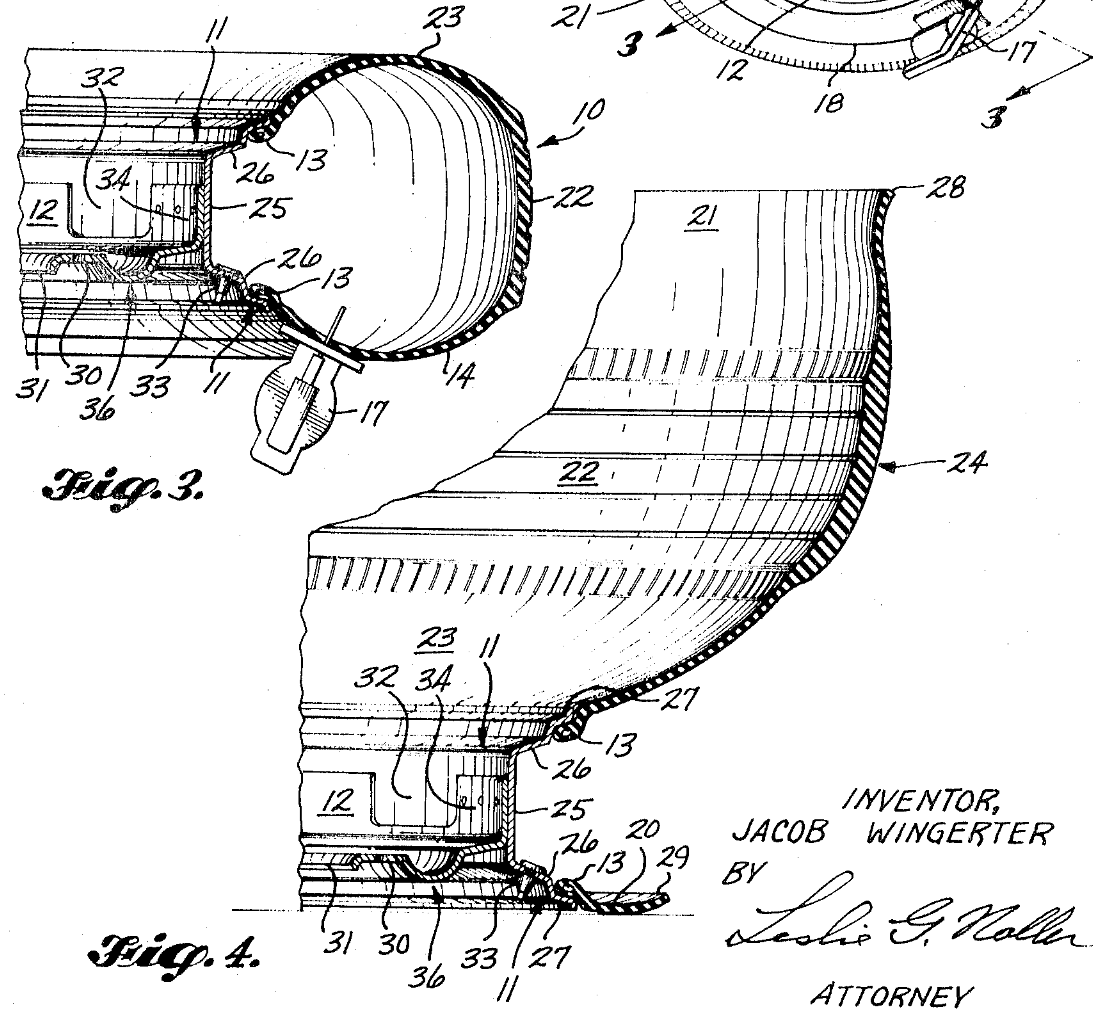
Fig. 3. Fig. 4.
INVENTOR,
JACOB WINGERTER
BY
Leslie G. Noller
ATTORNEY United States Patent Office 3,621,611

Patented Nov. 23, 1971

3,621,611

CONTAINER FOR PLANTS AND OTHER MATERIALS AND METHOD OF MAKING SAME

Jacob Wingerter, 9504 Maple SW., Tacoma, Wash. 98499

Filed Oct. 14, 1970, Ser. No. 80,579
Int. Cl. A01g *9/02;* A01k *5/00*
U.S. Cl. 47—34 11 Claims

ABSTRACT OF THE DISCLOSURE

A container primarily designed to hold soil in which to plant flowers, small trees, shrubs, flowers and other plants generally referred to as a "Planter" and constructed from a discarded automobile wheel having mounted thereon a worn and discarded automobile tire and the method of manufacturing such a container.

BACKGROUND OF THE INVENTION

Conventional planters are generally constructed of concrete, iron or wood. Such planters are subject to certain disadvantages. The concrete and iron planters are heavy and consequently immovable by ordinary means once they have been placed and filled with earth. Also, particularly in the case of the concrete planter, they generally do not provide drainage and are subject to cracking unless reinforcing material is used in their construction. Both concrete and iron planters will damage furniture or other objects which come in contact with them and will bruise animals or humans who accidentally contact them. Concrete and iron planters are also expensive. The wood in wooden planters is subject to rot and deterioration and even during the short period that the wood is still firm wooden planters require maintenance. The bottoms rot out fast and must be replaced or reinforced and the corners must be renailed frequently.

The containers of this invention have none of these disadvantages. Being made from discarded automobile wheels and tires they are inexpensive. They are durable and weatherproof and will last indefinitely without maintenance other than occasional refinishing. They are indestructible by accidental force. For instance, they can be hit by a moving vehicle or dropped from any height without damage to either the planter or the contacting object or surface because of the resiliency of the parts of the planter which contact the impacting object or surface. The planters of this invention may be used indoors or outdoors without fear of harm or damage to other objects, animals or humans due to accidental contact and may be attractively decorated by painting as more fully described below.

In addition to providing decorative, attractive and useful containers for plants, water and other materials, as more fully described below, the conversion of discarded automobile wheels and tires to such containers provides a utility for two articles of commerce, the wheel and the tire, which are no longer useful for the purpose for which they were manufactured. This conversion also helps to solve an otherwise difficult and growing disposal problem of the automobile repair industry. Although discarded automobile wheels have some outlet as scrap metal the supply is greater than the demand. Discarded automobile tires are becoming a practically unsolvable disposal problem. The most efficient method of disposal is, of course, burning but this method is being outlawed in practically every community by antipollution laws. Also fewer and fewer public dumps will now accept tires. Obviously, therefore, any invention that will provide a use for these discards of the automobile industry is a welcome boon to the industrv.

Some suggestions have been made for the conversion of automobile tires to containers for plants. One of these is described in U.S. Patent 2,199,845. This patent describes two methods of converting the tire to a container. The first simply utilizes the tire as is, after bending the side walls outwardly and optionally making a circumferential cut adjacent to the outer edge of one of the side walls. A circular wooden part is inserted to form a bottom for the container. This modification would have the same appearance as the original tire and for all intents and purposes is the original tire plus a bottom forming part. In a second modification the patentee makes two transverse cuts through the tire spaced a desired distance apart in order to remove a transverse section of the tire and thereby reduce its circumferential dimension. The space or gap is then closed by wire stitching and melting the cut edges of the tire. The wire stitches are covered by the melted rubber. Either of these methods results in scrap pieces of the tire which still present a disposal problem. Another suggestion for conversion of a used tire to a container for plants is described in U.S. Pat. 3,038,512. The container of this patent also utilizes only the tire. Again, as in the method of U.S. Pat. 2,199,845, a circumferential cut is made in one of the side walls eliminating the rim bead from that side. Additional generally radial or transverse cuts may be made inwardly from the cut edge of the same side wall. These latter cuts are indented only a short distance to simulate a toothed design. The tire is then inverted by pulling the side still containing the rim bead through the opening made by removal of the bead on the first side. The inversion step according to the method of this patent requires the removal of the bead from the first side. It is even very difficult to achieve the inversion after removal of the bead so the patentee recommends that the above mentioned tooth-like cuts be made prior to inversion in order to give more flexibility to the side wall of the tire. Even with this increased flexibility it would still be very difficult to invert the whole tire. As in the case of U.S. Pat. 2,199,845, scrap pieces of the tire result from the method of U.S. Pat. 3,038,512 in the form of the discarded bead and the triangular, square or rectangular pieces cut from the top side wall to produce the desired design and facilitate inversion of the tire.

SUMMARY OF THE INVENTION

The invention herein described is an improvement of the aforesaid planters made from automobile tires and other materials such as concrete, iron or wood and presents advantages not achieved by such other planters. It also provides a basic container which can be adapted to many uses other than as a container for plants. Such uses include a bird bath, a fountain bowl and base, a hassock, a seat, a container for animal feed or water and a pedestal for a table.

Accordingly, it is an object of this invention to make a container from a discarded automobile tire and wheel which will be versatile in its use.

Another object is to provide an attractive container for plants or other objects or materials which will have a resilient base or pedestal, a firm column and a resilient bowl.

A further object is to provide such a container which is simple to construct, light of weight, durable and maintenance free.

With these objects in view and others that will appear from the following description the invention in its novel and distinctive aspects will be more fully described hereinafter, illustrated in the drawing and defined in the appended claims.

In the drawing forming a part of this application in which the reference characters designate like parts in the several views:

FIG. 1 is a perspective view of a container or receptacle made in accordance with this invention.

FIG. 2 is a perspective view of an automobile tire mounted on an automobile wheel showing a cutting instrument inserted in the side wall of the tire.

FIG. 3 is a partial transverse sectional view of the tire mounted on the wheel with inserted cutting tool shown in FIG. 2, said sectional view being taken generally in the plane of line 3—3 of FIG. 2.

FIG. 4 is a partial transverse sectional view of one side of the container of this invention taken generally in the plane of line 4—4 of FIG. 1.

DESCRIPTION OF THE PREFERRED EMBODIMENT

Referring now to the drawing and particularly to FIG. 1, there is illustrated a container constructed according to the instant invention. This container is generally urn or vase shaped and consists of three main parts. These are an automobile wheel 12, which forms both the column 35 and the bottom of the bowl 24 of the container, an inverted first portion of an automobile tire consisting of tire sections 21, 22 and 23 (FIG. 2), which forms the bowl 24 of the container and a second portion of an automobile tire consisting of tire section 20 (FIG. 2) which forms the base or pedestal of the container. The wheel used in the construction of this container is comprised of a central frame member 36 which is generally the shape of an irregular disc having integral therewith perpendicularly disposed side members 34 which are fixedly attached to a rim member 11 which comprises a base section 25 and flange 26 and edge 27 parts adapted to receive the tire. The tire is of the conventional type, having a tread section 22, sidewalls 14 and 23 and rim beads 13. All parts of both the wheel and tire are used in the construction of this container as will appear hereinafter.

Now referring particularly to FIGS. 2 and 3 a tire 10 is mounted on the rim 11 of a wheel 12 and is inflated. Although any automobile tire, whether of the tube or tubeless type, may be used, the tubeless type is preferred because it seals better to the rim and is leakproof at the point of sealing. For aesthetic appeal the so-called wide track and snow tires are preferred. For the wheel the safety rim type is best suited because the tire rim bead becomes self sealed to the rim when inflated and remains sealed when the tire is cut, deflated and inverted. The tire must be inflatable to achieve the desired seal of the tire bead 13 to the wheel rim 11. Although the tire need not be capable of holding air pressure indefinitely as in the case of a new tire, it should be capable of remaining substantially inflated until an initial cut can be made in the side wall. It is difficult to properly puncture a deflated tire for the purpose of this invention.

As shown in FIG. 2 the mounted and inflated tire is punctured in the side wall 14 which would face out if mounted on an automobile axle. The puncture is made at a point 15 which is located inwardly of and a short distance removed from the outer ridge of the tire tread 16. After the said puncture has been made and the puncturing tool removed, a cutting tool 17, such as a saber saw, is inserted in the puncture and drawn completely around the circumference of the side wall 14 in a complete circle 18 which starts and ends at point 15. FIG. 2 shows the cutting tool 17 at a position short of the point 15 but it is understood that the cut will be completed as shown by the broken line 19. The circular cut provides plain outside edges for the pedestal or base and the bowl of the completed container, as shown in FIG. 1. If it is desired to have designed edges on the base and bowl rather than plain edges, then instead of making a circular cut starting at the puncture point 15, a circular line is chalked on the side wall of the tire where the circular cut would have been. Then the cut is made in the pattern of the desired design using the chalked line as the base line of the cut and the outer ridge 16 of the tire tread as the top of the cut for the valleys and peaks respectively of the selected design. Any desired design capable of being cut in a continuous up and down line may be used. For example attractive shapes such as will simulate the tips of tulip petals may be made by a scroll cut. When making such irregular cuts it is desirable while the tire is still inflated to draw the pattern on the side wall of the tire to establish a uniform line around the circumference of the side wall. Such a patterned cut may be made according to the method of this invention without producing any scrap since the single cut simultaneously delineates both the top and bottom edges 28 and 29 of the container.

After the cut 18 has been made and the side wall 14 severed into two sections the inner such section 20 becomes the base or pedestal of the container. The remainder of the tire, including the outer section 21 of side wall 14, the tread section 22 and the opposite side wall 23, is turned inside out or inverted in a direction outwardly and upwardly with respect to the wheel 12 as it appears in FIG. 2. This inversion of said remainder of the tire may be accomplished manually or by mechanical means. When inverted the said remainder of the tire, consisting of parts 21, 22 and 23, forms the bowl 24 of the completed container. What was formerly the inside of the tire now forms the outside of the bowl 24 and base of the container. The base 25 and flanges 26 of the rim of the wheel become exposed as shown in FIGS. 1 and 4 forming the column or trunk 35 of the container.

As shown in FIG. 4 rim beads 13 of the tire remain sealed to the outer edges 27 of the wheel rim. As shown in FIGS. 1 and 4 the tip of the outer section 21 of the first side wall 14 bends outwardly due to the tendency of the molded tire material to assume the original position it had as part of the said first side wall 14 prior to inversion of the upper part of the tire, consisting of parts 21, 22 and 23. This outward bend of the said outer section 21 gives a pleasing architectural reverse curve contoured effect to the bowl 24 of the container. As the base section 20 still retains the normal position that it had as part of the side wall 14 it curves away from the rim edge 27 to which it is attached first downwardly and then upwardly providing a resilient rounded surface for the base of the container. This prevents any part of the wheel from contacting the surface on which the container rests. The valve stem 33 used to inflate the tire may be removed or left in the wheel rim at the option of the manufacturer or user. It serves no useful function once the tire has been cut but is inconspicuous in the normal position of the container when in use.

After the inversion of the top section of the tire has been completed the entire container can be painted any desired color. The paint may be applied either by the manufacturer or the user. Although designed to be used as a planter in its basic form described above, this container may be put to other uses, as mentioned above. When used as a planter the bolt holes 30, axle hole 31 and frame openings 32 of the central frame portion 36 of the wheel provide adequate drainage so that the soil remains sweet and need not be replaced as is often the case with non-drainable planters. When used as a bird bath or animal watering or feeding container it is merely necessary to close off the said wheel holes and openings by any suitable means such as a layer of concrete. When used as a hassock it is merely necessary to place a circular piece of wood or other firm material on the inner side of the bowl 24 of the container at any desired depth preferably resting on a rib formed by the tire tread. This forms a platform or base on which to place a pillow of upholstered foamed rubber or plastic filler material. When used as a table the container may be turned upside down so that the base flange 20 can be used as a receiving surface to which the table top may be fastened by any suitable means. A chair may be made from the basic container by merely heating and thereby softening the rubber of the bowl so that the front and sides of the bowl may be rolled outwardly and downwardly to form the arms and skirt of the chair. It is then necessary only to cover the wheel with a pillow or a platform and pillow as desired. Other uses of the basic container and the conversion thereof to fit such uses will readily suggest themselves.

The container of this invention made from discarded automobile wheels and tires consisting in its final form of a resilient base, a firm column or trunk and a resilient bowl will be seen to present distinct advantages and improvements over plant containers previously made only from automobile tires of the type heretofore mentioned. The container of this invention is easy to make. Since the tire is firmly sealed to the wheel rim and only part of the tire rather than the whole tire is inverted, the inversion step is not difficult to perform. The container of this invention stands higher than containers made only from tires and the soil used for planting is held up from the ground or other surface on which the container rests, while nevertheless providing adequate drainage as described above. The container of this invention can be moved from one spot to another by dragging without marring the surface over which it is dragged. Since the tire and wheel combination have been completely converted to an urn shaped container a new article of commerce has been created. It is not just an old tire. In fact, when painted and in use it is a very attractive patio, garden or household accessory and it is difficult to detect its origin. Also, as pointed out above, no scrap material results from the manufacture of this new container. The entire wheel and tire has been used eliminating any disposal problem for either or any part of them.

The foregoing description and accompanying drawing are intended to be illustrative of the invention rather than limiting since the invention may be variously embodied. The scope of the invention is to be determined as claimed.

What is claimed is:

1. A container comprising in combination:

(i) a centrally disposed columnar member consisting of an automobile wheel having a generally disc shaped frame member, a ring shaped rim member integral with said frame member, said rim comprising a base member and two flanged edge members spaced apart by said base member and adapted to receive and firmly hold an automobile tire;

(ii) a base member providing support for the container and consisting of a generally circumferentially severed portion of the outer side wall of an automobile tire, said portion being integral with the rim bead of the tire, said rim bead being circumferentially mounted on the outer flange of the said wheel rim;

(iii) a bowl member consisting of an inverted portion of an automobile tire, said portion consisting of the tire tread section with the tread facing inwardly of the bowl, a severed portion of the outer side wall of the tire integral with the tread section, said portion forming the outer rim and edge of the bowl and the entire inner side wall of the tire integral with the tread section on one side of its extremities and integral with the inner rim bead at its opposite extremity, said rim bead being circumferentially mounted on the inner flange of said automobile wheel.

2. The container of claim 1 in which the frame portion of the wheel has integral perpendicularly disposed side members which are fixedly attached to the inner side of the wheel rim base.

3. The container of claim 1 in which the frame portion of the wheel has openings providing drainage to the space delineated by the base member and the outer side of the wheel frame member.

4. The container of claim 3 in which the openings are comprised of wheel bolt and axle holes.

5. The container of claim 1 in which the rim bead of the base member (ii) is mounted in self-sealed relationship on the outer flange of the wheel rim.

6. The container of claim 1 in which the rim bead of the bowl member (iii) is mounted in self-sealed relationship on the inner flange of the wheel rim.

7. The container of claim 1 in which the wheel is of the safety-rim type.

8. The method of making a container from the combination of an automobile wheel and an automobile tire which comprises:

(i) mounting and inflating an automobile tire on an automobile wheel adapted to receive and hold such a tire;

(ii) cutting the outer side wall completely around its circumference using a base line for the cut which is spaced inwardly from the outer ridge of the tread;

(iii) inverting the severed part of the tire consisting of the tire tread section, a portion of the outer side wall integral with the tire tread section and the entire inner side wall integral with the tire tread section at one of its extremities and integral with a tire rim bead which latter is fixedly attached to a flange of the wheel rim at its other extremity.

9. The method of claim 8 in which the automobile tire is mounted on a safety-rim type automobile wheel and inflated so as to self seal the rim beads of the tire to the flanges of the said safety-rim wheel.

10. The method of claim 8 in which the outer side wall of the mounted and inflated tire is punctured prior to cutting around its circumference.

11. The method of claim 10 in which the circumferential cutting of the outer side wall is effected by inserting a cutting tool in the puncture and drawing the cutting tool around the circumference of the said outer side wall along an established line.

References Cited

UNITED STATES PATENTS

| | | | |
|---|---|---|---|
| 2,199,845 | 5/1940 | Wolf | 150—50 |
| 2,718,875 | 9/1955 | Schaubel | 119—61 |
| 3,038,512 | 6/1962 | Staton | 150—50 |
| 3,074,377 | 1/1963 | Spencer | 119—61 X |
| 3,330,257 | 7/1967 | Warner | 119—61 |

ROBERT E. BAGWILL, Primary Examiner

U.S. Cl. X.R.

29—403; 119—61; 150—.5, 50